(12) United States Patent
Yamashita et al.

(10) Patent No.: US 10,072,226 B2
(45) Date of Patent: Sep. 11, 2018

(54) METHOD FOR MANUFACTURING DRIED COMBUSTIBLE MATERIAL AND DRIED COMBUSTIBLE MATERIAL

(71) Applicant: ACT CO., LTD., Konan-shi, Aichi (JP)

(72) Inventors: Hiroyuki Yamashita, Kuwana (JP); Akihisa Okuda, Konan (JP)

(73) Assignee: ACT CO., LTD., Konan (JP)

(*) Notice: Subject to any disclaimer, the term of this patent is extended or adjusted under 35 U.S.C. 154(b) by 555 days.

(21) Appl. No.: 14/391,960

(22) PCT Filed: Feb. 25, 2014

(86) PCT No.: PCT/JP2014/054410
§ 371 (c)(1),
(2) Date: Oct. 10, 2014

(87) PCT Pub. No.: WO2015/128923
PCT Pub. Date: Sep. 3, 2015

(65) Prior Publication Data
US 2015/0240177 A1    Aug. 27, 2015

(51) Int. Cl.
*C10L 5/06* (2006.01)
*C10L 5/32* (2006.01)
(Continued)

(52) U.S. Cl.
CPC ............ *C10L 5/32* (2013.01); *C10L 5/14* (2013.01); *C10L 5/361* (2013.01); *C10L 5/42* (2013.01);
(Continued)

(58) Field of Classification Search
CPC .......... C02F 11/121; C10L 5/363; C10L 5/36; C10L 5/46; C10L 2200/0469; C10L 2290/08; C10L 5/32
See application file for complete search history.

(56) References Cited

U.S. PATENT DOCUMENTS 1,960,917 A    5/1934 Nagelvoort
4,236,897 A *  12/1980 Johnston .................. C10L 5/44
                                              44/491
(Continued)

FOREIGN PATENT DOCUMENTS

EA    000979 B1    8/2000
EP    00032811 A2  7/1981
(Continued)

OTHER PUBLICATIONS

Machine Translation of WO-2011132828-A1 (Year: 2011).*
(Continued)

*Primary Examiner* — Ellen M McAvoy
*Assistant Examiner* — Ming Cheung Po
(74) *Attorney, Agent, or Firm* — Oliff PLC (57) ABSTRACT

A method for manufacturing dried combustible material includes: a mixing step of mixing a number of particles made of combustible material containing moisture and a dehydrating liquid made of an emulsion containing synthetic resin to form a mixture in which surfaces of the particles are made contact with the dehydrating liquid; and a drying step of forming a synthetic resin coating made of the dehydrating liquid dried on the surfaces of the particles and evaporating the moisture of the particles, to form coated particles including the particles having a reduced moisture content percentage and the synthetic resin coating that covers the surfaces of the particles, and produce dried combustible material made up of the coated particles.

15 Claims, 3 Drawing Sheets

(51) Int. Cl.
*C10L 5/46* (2006.01)
*C10L 5/48* (2006.01)
*C10L 5/14* (2006.01)
*C10L 5/36* (2006.01)
*C10L 5/42* (2006.01)
*C10L 5/44* (2006.01)

(52) U.S. Cl.
CPC .............. *C10L 5/445* (2013.01); *C10L 5/46* (2013.01); *C10L 5/48* (2013.01); *C10L 2200/0469* (2013.01); *C10L 2250/04* (2013.01); *C10L 2250/06* (2013.01); *C10L 2290/08* (2013.01); *C10L 2290/145* (2013.01); *C10L 2290/20* (2013.01); *C10L 2290/24* (2013.01); *Y02E 50/10* (2013.01); *Y02E 50/30* (2013.01)

(56) References Cited

U.S. PATENT DOCUMENTS

| | | | |
|---|---|---|---|
| 4,304,573 | A | 12/1981 | Burgess et al. |
| 4,332,593 | A | 6/1982 | Burgess et al. |
| 4,389,218 | A | 6/1983 | Pike |
| 4,485,584 | A | 12/1984 | Raulerson et al. |
| 2011/0078947 | A1 | 4/2011 | Kiyama |
| 2011/0296742 | A1 | 12/2011 | Goessler et al. |

FOREIGN PATENT DOCUMENTS

| | | | |
|---|---|---|---|
| GB | 874686 A | 8/1961 | |
| JP | A-58-127794 | 7/1983 | |
| JP | U-58-148050 | 10/1983 | |
| JP | A-62-591 | 1/1987 | |
| JP | A-11-35959 | 2/1999 | |
| JP | A-2008-81568 | 4/2008 | |
| JP | 2008297508 A | 12/2008 | |
| JP | 2010024393 A | 2/2010 | |
| JP | A-2011-153282 | 8/2011 | |
| JP | 2012503052 A | 2/2012 | |
| JP | A-2013-72013 | 4/2013 | |
| JP | A-2014-62155 | 4/2014 | |
| RU | 2471859 C2 | 1/2013 | |
| WO | WO-2011132828 A1 * | 10/2011 | ............... C10L 5/14 |
| WO | 2013/027082 A1 | 2/2013 | |

OTHER PUBLICATIONS

Aug. 30, 2016 International Preliminary Report on Patentability issued in International Patent Application No. PCT/JP2014/054410.
Feb. 19, 2016 Office Action issued in Russian Patent Application No. 2014147612/04(076543).
Apr. 27, 2016 Correction to Feb. 19, 2016 Office Action issued in Russian Patent Application No. 2014147612/04(076543).
Aug. 28, 2017 Search Report issued in European Patent Application No. 14783757.9.
May 20, 2014 Search Report issued in International Patent Application No. PCT/JP2014/054410 (with translation).

* cited by examiner

METHOD FOR MANUFACTURING DRIED COMBUSTIBLE MATERIAL AND DRIED COMBUSTIBLE MATERIAL

TECHNICAL FIELD

The present invention relates to a method for manufacturing dried combustible material utilizable as a fuel, for example.

BACKGROUND ART

As a result of economic activities, combustible materials containing water or moisture are discharged in various forms such as sludge, animal and/or plant wastes, and others. Such combustible materials are subjected to incineration treatment, drying treatment, and others to reduce the volume or weight thereof and then disposed by landfill. Recently, there is an increasing demand to recycle those combustible materials as resources.

As one example of recycling the combustible material, a biomass fuel made from combustible material is disclosed in Patent Document 1. This document teaches the biomass fuel prepared in such a way that the surface of biomass granulated material having a reduced moisture content percentage is coated with a deodorant coating layer. This is intended to reduce odor or smell peculiar to organic wastes which are raw materials of the biomass granulated material and thereby improve the ease in handling the biomass fuel.

RELATED ART DOCUMENTS

Patent Documents

Patent Document 1: JP-A-2008-81568

SUMMARY OF INVENTION

Problems to be Solved by the Invention

Meanwhile, the biomass fuel disclosed in Patent Document 1 is made from previously dried combustible material whose surface is covered with a coating in order to reduce moisture absorption during storage. However, this configuration needs additional steps of forming and drying the coating layer after the step of drying the combustible material. This results in a complicated process.

When wet combustible material, not limited to the aforementioned biomass fuel, is to be dried to reduce the moisture (water) content percentage, a drying method such as hot-air drying and vacuum drying is generally adopted. However, another method enabling increasing a drying speed more than the above conventional drying method is demanded.

The present invention has been made in view of the circumstances and has a purpose to provide a method for manufacturing dried combustible material, capable of increasing a drying speed of combustible material in a simple process, and the dried combustible material manufactured by the method.

Means of Solving the Problems

To achieve the above purpose, one aspect of the invention provides a method for manufacturing dried combustible material, the method including: a mixing step of mixing a number of particles made of combustible material containing moisture and a dehydrating liquid made of an emulsion containing synthetic resin to form a mixture in which surfaces of the particles are made contact with the dehydrating liquid; and a drying step of forming a synthetic resin coating made of the dehydrating liquid dried on the surfaces of the particles and evaporating the moisture of the particles, to form coated particles including the particles having a reduced moisture content percentage and the synthetic resin coating that covers the surfaces of the particles, and produce the dried combustible material made up of the coated particles.

Another aspect of the invention provides a dried combustible material made up of coated particles, the coated particles including particles made of combustible material having a moisture content percentage of 20 mass % or less and a synthetic resin coating that covers surfaces of the particles.

Effects of the Invention

In the method for manufacturing the above dried combustible material, the mixing step includes forming a mixture from the particles and the dehydrating liquid, in which the surfaces of the particles are made contact with the dehydrating liquid. Accordingly, the surfaces of the particles can be coated evenly with the dehydrating liquid. If the surface of each particle has a number of pores, it is expectable that the dehydrating liquid penetrates into each pore.

In the above drying step, when the mixture is dried, the dehydrating liquid is dried and also the moisture or water contained in the particles is evaporated. Consequently, the dehydrating liquid acts to prompt or accelerate evaporation of the moisture contained in the particles, thereby enabling increasing the drying speed of the mixture. The reason why the dehydrating liquid accelerates the evaporation of the moisture contained in the particles has not been completely clarified yet. However, the drying acceleration effect of the dehydrating liquid has been confirmed in a test result mentioned later.

In the above drying step, as mentioned above, the dehydrating liquid and the particles are simultaneously dried, thereby enabling simultaneously reducing the moisture content percentage of the particles and forming of the synthetic resin. This can more simplify the process of manufacturing the dried combustible material.

As above, the aforementioned dried combustible material manufacturing method can increase the drying speed of the combustible material by a simple process.

The aforementioned dried combustible material manufactured by the above manufacturing method is low in moisture content percentage and thus is small in volume and weight. This enables easy storage and transportation of the dried combustible material. Since the dried combustible material has a low moisture content percentage, the dried combustible material is likely to generate a relatively large amount of heat when it is used as fuel. Furthermore, because of the presence of the synthetic resin coating, it is possible to suppress the dried combustible material from absorbing moisture during storage to prevent the moisture content percentage from increasing and the dried combustible material from becoming sticky. Therefore, the above dried combustible material is very easy to handle.

MODE FOR CARRYING OUT THE INVENTION

In the aforementioned method for manufacturing dried combustible material, the particles to be used in the mixing step may be combustible material in an original form or may be combustible material pulverized or cut in advance to increase the surface area. As the surface area of the particles is larger, a greater amount of the dehydrating liquid comes in contact with the particle surfaces. This makes it easy to increase the drying speed.

The dried combustible material obtained as above may be formed from either one of the coated particles individually separated or a plurality of the coated particles bonded to each other or may be formed from a combination thereof.

Further, the above drying step may include forcibly blowing air toward the mixture. In this case, the drying speed of the mixture can be more increased. In this case, alternatively, the air allowed to blow toward the mixture may be heated as needed.

It is preferable that the above drying step is performed until the moisture content percentage of the dried combustible material is reduced to 20 mass % or lower. The above dried combustible material is smaller in volume and weight as a value of the moisture content percentage is smaller. This dried combustible material can be more easily stored and transported. In a case of using the dried combustible material as fuel, the heat generating amount during burning becomes larger as the value of the moisture content percentage is smaller and thus the dried combustible material can be appropriately used as fuel. Accordingly, the moisture content percentage of the dried combustible material is preferably 20 mass % or less, more preferably 18 mass % or less, and further preferably 15 mass % or less. It is to be noted that the moisture content percentage of the dried combustible material can be made smaller as the drying time in the drying step is set longer. However, when the dried combustible material of less than 10 mass % is to be obtained, the drying time may be excessively long according to the kinds of the combustible material, leading to deteriorated productivity.

Herein, the moisture content percentage represents a ratio of the moisture content with respect to the total weight of an object to be measured. That is, assuming that the total weight of the measurement object is W(g) and the moisture content is h(g), the moisture content percentage w(mass %) can be calculated by the following formula (1):

$$w = h/W \times 100 \qquad (1)$$

Preferably, the synthetic resin contained in the dehydrating liquid preferably is acrylic rein, urethane resin, or polyvinyl acetate resin. The dehydrating liquid containing the above resin relatively greatly acts to accelerate drying of the particles and thus can be suitably used to dry the particles. The synthetic resin coating made of the above resin is water-repellent and thus enables reducing moisture absorption of the dried combustible material during storage and others and preventing the moisture content percentage from increasing or the dried combustible material from becoming sticky. Accordingly, the dried combustible material easier to handle can be obtained.

It is preferable that the drying step is performed, after the mixing step, on the mixture having been formed in a plate-like shape having a thickness of 10 mm or less. By forming the mixture into the above shape, the distance at which the moisture travels from the inside of the formed mixture toward the surface thereof can be shortened. This can further increase the drying speed of the mixture. The drying speed is faster as the thickness of the formed mixture is smaller. Thus, this thickness is preferably 10 mm or less, more preferably 8 mm or less, still more preferably 5 mm or less, and particularly preferably 3 mm or less.

In a case of forming the mixture into a plate-like shape as above, preferably, the drying step is performed on the mixture having been formed in a plate-like shape and separated in a plurality of blocks. In this case, in the drying step, the surface area can be made larger as compared with the case where the mixture is not separated into blocks. Accordingly, the drying speed of the mixture can be more increased.

An adoptable one as the method for separating the mixture into blocks is for example a method in which cut surfaces are formed to partition the mixture into sections each having a desired size during forming or before start of the drying step after forming. In this case, contraction of the mixture caused by drying allows the mixture to be naturally divided along the cut surfaces. Thus, the resultant dried combustible materials are likely to be uniform in size and the dried combustible material easy to handle can be obtained.

The mixture may be formed into pellets, not formed into the plate-like shape, by use of a granulator such as a pelletizer. In this case, similar to the above, the distance at which the moisture travels from the inside to the outer surface of a pellet-shaped mixture can be shortened, thereby further increasing the drying speed of the mixture. In the case of forming the mixture into pellets, each particle diameter is preferably 10 mm or less, more preferably 8 mm or less, still more preferably 5 mm or less.

The particle diameter of the pelletized mixture can be determined for example by the following method. Of rectangular parallelepiped bodies each containing the mixture, one having a minimum volume is selected. Of the sizes in the axial directions of the selected rectangular parallelepiped body, a minimum size is determined as the particle diameter of the mixture.

The above combustible material is not limited particularly as long as it is combustible. For example, it is selectable from organic sludge prepared by subjecting sewage or wastewater discharged from various factories to a dehydrating treatment, livestock excretion, animal and/or plant waste, and others.

From among the above, sewage sludge and food waste are appropriately used as the combustible material. The sewage sludge and food waste may decay if they are stored with maintaining a high moisture content percentage. In addition, they are likely to generate peculiar odor. Thus, they are relatively difficult to store as compared with other combustible materials. Even when the sewage sludge and food waste having such characteristics are used, their moisture content percentages can be reduced promptly as mentioned above, so that they can be easily stored for a long term with suppressed decay. The reduced moisture content percentage furthermore can reduce generation of peculiar odor.

Further, lignite or brown coal may be used as the combustible material. Among coals, the lignite has a relatively high moisture content percentage and low combustion efficiency. Thus, the lignite is conventionally used for example to fill a pit after coal mining. However, in view of recent increased energy demand, it is desired to convert the lignite into fuel. When the lignite is used as the combustible material, the moisture content percentage thereof can be reduced rapidly as mentioned above. Accordingly, it is expected to enhance the combustion efficiency of lignite and utilize the lignite as fuel.

When the lignite is used as the combustible material as above, the particle diameter of each particle is preferably 5 mm or less. In this case, as with the above, the surface area of each particle can be increased, thereby making easy to increase the drying speed. An adoptable method for measuring the particle diameter in this case is for example the aforementioned method for measuring the particle diameter of the pelletized mixture.

Preferably, the dried combustible material manufactured by the aforementioned manufacturing method generates an amount of heat of 3700 to 5000 kcal/kg when it is burned. In this case, the heat amount deriving from the burned dried combustible material is suitable as fuel and thus the dried combustible material can be suitably used as fuel.

In the aforementioned dried combustible material, preferably, the synthetic resin coating is made of acrylic resin, urethane resin, or polyvinyl acetate resin. In this case, as with above, drying of the particles is accelerated, thereby making easy to further reduce the moisture content percentage of the dried combustible material. Since the synthetic resin coating is water-repellent, the dried combustible material can more reduce moisture absorption during storage and hence can be stored for a long period.

In the aforementioned dried combustible material, the particles may be made from sewage sludge or food waste having a moisture content percentage reduced to 20 mass % or less. As above, the sewage sludge and the food waste are hard to store in a state with high moisture content percentage. However, since the moisture content percentage is reduced to 20 mass % or less, the dried combustible material can be achieved with reduced generation of odor and suppressed decay and can be stored for a long period. In addition, because of the moisture content percentage reduced to 20 mass % or less, the dried combustible material can generate a larger heat amount when it is burned and thus is usable as fuel.

In the aforementioned the dried combustible material, the particles may be made of lignite having a moisture content percentage reduced to 20 mass % or less. As above, the lignite is hard to utilize as fuel due to its high moisture content percentage. However, when the moisture content percentage is reduced to 20 mass % or less, the dried combustible material can generate an increased heat amount when it is burned and thus can be utilized suitably as fuel.

EXAMPLES

Examples of the aforementioned method for manufacturing the dried combustible material will be explained below. The above manufacturing method is not limited to the following examples and may be appropriately changed or modified in a scope of the invention.

Example 1

Figure 1:
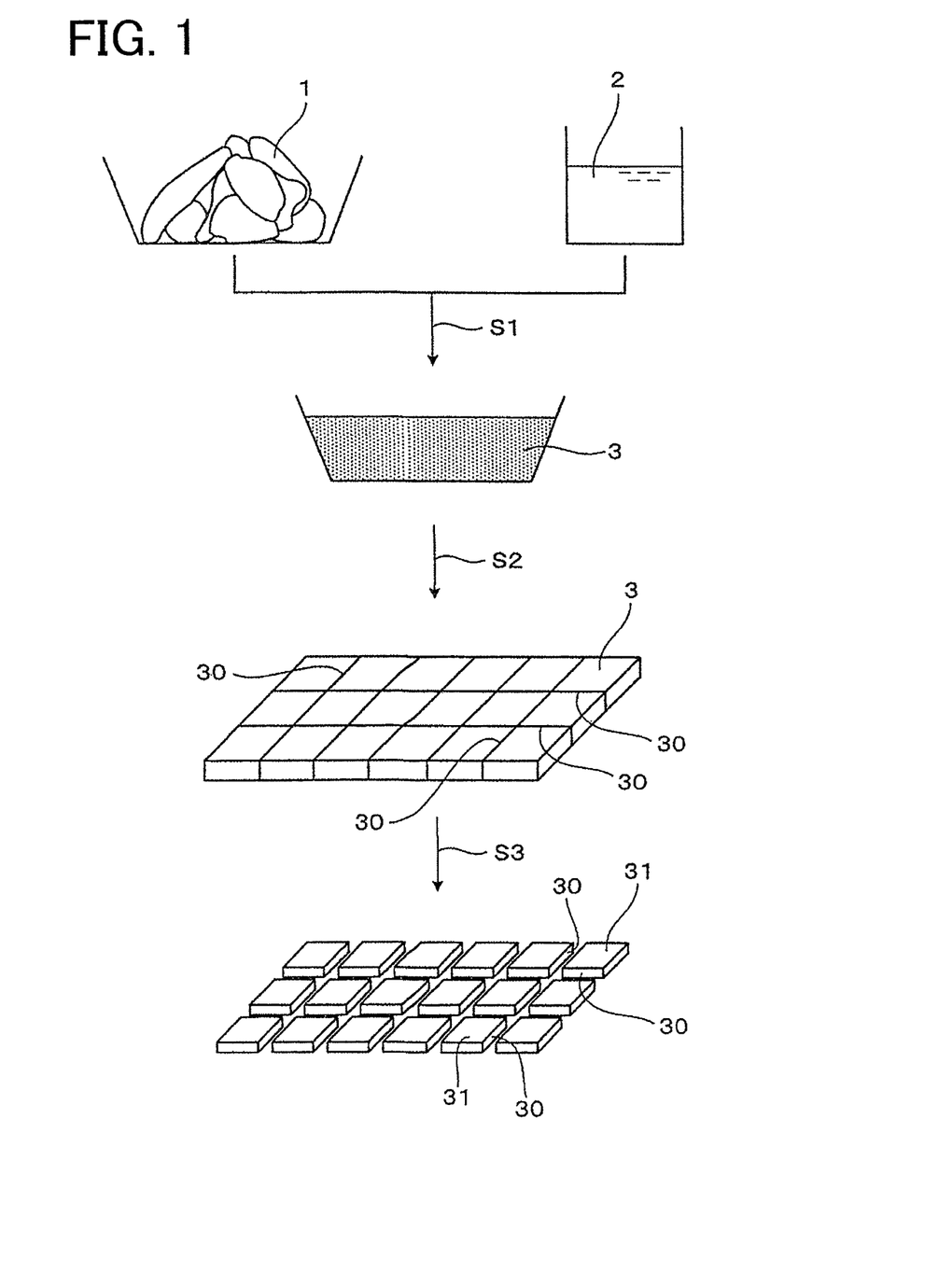
FIG. 1 is an explanatory view showing a method for manufacturing dried combustible material in Example 1.

This example shows a case of manufacturing dried combustible material by using sewage sludge as the combustible material. In this example, as shown in FIG. 1, dewatered cake 1 is used as the combustible material. In a mixing step S1, this dewatered cake 1 is mixed with a dehydrating liquid 2 to form a mixture 3. After the mixing step S1, the mixture 3 is formed into a plate-like shape and divided into a plurality blocks in a forming step S2. Thereafter, the mixture 3 is dried in a drying step S3. Thus, dried combustible material 31 is produced. Hereinafter, the combustible material, the dehydrating liquid 2, the details of each step, and a method for measuring the moisture content percentage in the present example will be explained.

<Combustible Material>

Figure 2:
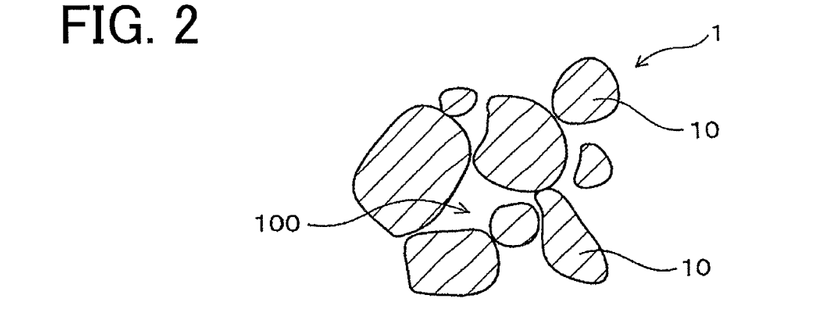
FIG. 2 is an explanatory view showing particles constituting sewage sludge in Example 1.

The combustible material used in this example is the dewatered cake 1 compressed in a solid state in advance by a presser or the like. This dewatered cake 1 consists of aggregated particles 10 having different particle diameters as shown in FIG. 2. Each of the particles 10 contains moisture, i.e., is wet. A void 100 formed between the particles 10 is likely to retain moisture. The moisture content percentage of the dewatered cake 1 used in the present example is 67.0 to 75.8 mass % as shown in Table 1.

<Dehydrating Liquid 2>

The dehydrating liquids 2 used in the present example are prepared by appropriately various kinds of diluting emulsions containing different synthetic resins as listed in Table 2.

<Mixing Step S1>

Figure 3:
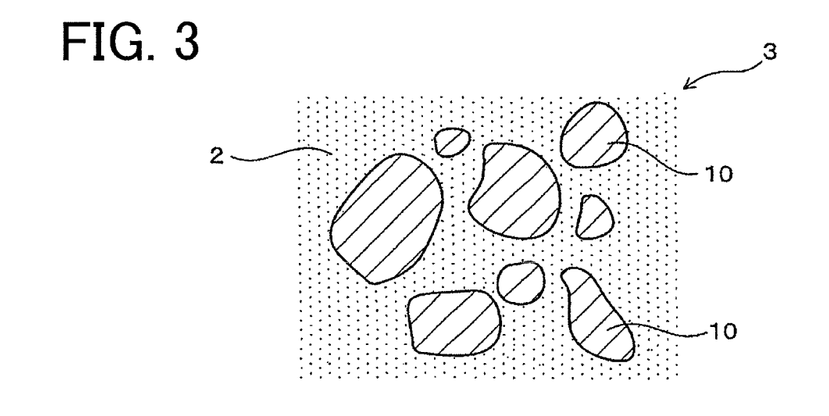
FIG. 3 is an explanatory view showing particles whose surfaces are made contact with a dehydrating liquid in Example 1.

In the mixing step S1, as shown in experimental examples 1 to 10 in Table 1, different dehydrating liquids 2 are added to the dewatered cakes 1 at respective weight ratios shown in Table 1. Thereafter, each mixed matter is stirred for 5 to 10 minutes, thereby producing respective mixtures 3 of the dewatered cakes 1 and the dehydrating liquids 2, as shown in FIG. 1. While stirring in the mixing step S1, the surface of each particle 10 comes in contact with the dehydrating liquid 2 in the mixture 3 as shown in FIG. 3. At the end of the mixing step S1, accordingly, the surface of each particle 10 is evenly coated with the dehydrating liquid 2.

<Forming Step S2>

In the forming step S2, the mixture 3 in paste form obtained in the mixing step S1 is formed into a plate-like shape of a thickness 5 mm. Then, the mixture 3 is cut with a cutter to form cut surfaces 30 whereby the mixture 3 is partitioned into nearly 20-mm square sections when seen from above in a thickness direction of the mixture 3. The cut surfaces 30 allow the mixture 3 to be separated into a plurality of blocks.

<Drying Step S3>

Figure 4:
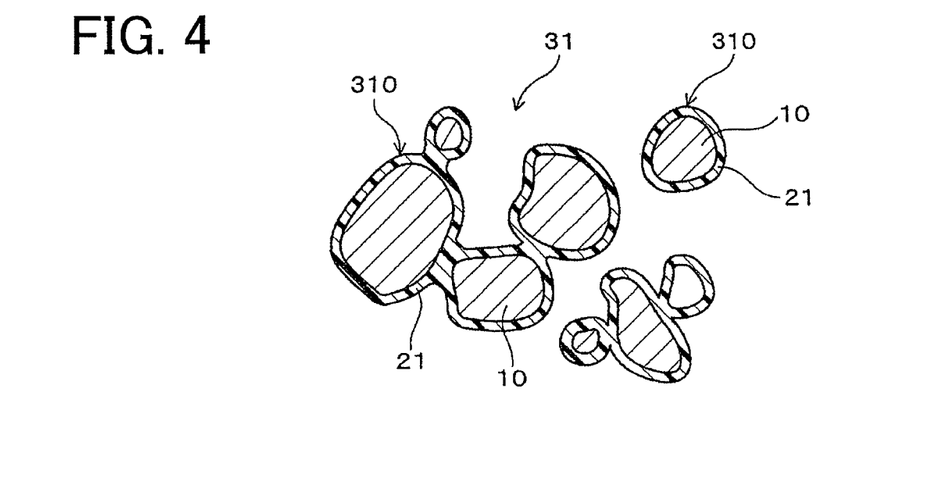
FIG. 4 is an explanatory view showing coated particles in Example 1.

In the drying step S3, the mixture 3 separated into blocks each having a nearly 20-mm square in the forming step S2 is dried, forming a synthetic resin coating 21 of the dried dehydrating liquid 2 on the surface of each particle 10 and also evaporating the moisture from each particle 10. Accordingly, as shown in FIG. 4, coated particles 310 are made from the particles 10 with reduced moisture content percentage and the synthetic resin coatings 21 covering the particles 10. As the mixture 3 contracts or shrinks in association with drying, the mixture 3 is naturally divided along the cut surfaces 30 as shown in FIG. 1. Thus, dried combustible material 31 made up of a plurality of the coated particles 310 bonded to each other through the synthetic resin coatings 21 is produced. In this example, an air-blow drying is adopted as a method for drying the mixture 3. This air-blow drying method is performed by placing the mixture 3 under a room-temperature environment and blowing air to the mixture 3 through an air blower or the like to dry the mixture 3. In the present example, the room temperature varied in a range of 20 to 38° C. The air blower used in the present example had an air velocity of 1.9 to 5.2 m/s at a position 50-cm away from the air blower.

<Method for Measuring Moisture Content Percentage>

The mixture 3 to be measured was sampled by 5 g and subjected to measurement of moisture content percentage to be calculated by the above formula (1) by use of a heating-drying moisture meter (Model ML-50 by A&D Company Ltd.). Measurement results of the moisture content percentage are as shown in Table 1. In each of the experimental examples, the moisture content percentage was measured before the dewatered cake 1 was mixed with the dehydrating liquid 2 (before mixing), before the mixture 3 was subjected to air-blow drying (before start of drying), and after the air-blow drying was performed for 12 hours (at the completion of drying).

TABLE 1

| Experimental example No. | Combustible Material (CM) | Dehydrating Liquid 2 (DL) | Drying Method | Mixing Ratio CM | Mixing Ratio DL 2 | Moisture Content Percentage (mass %) Before mixing | Moisture Content Percentage (mass %) At start of drying | Moisture Content Percentage (mass %) At completion of drying |
|---|---|---|---|---|---|---|---|---|
| Exp. 1 | sewage sludge | DL: A1 | Air-blow | 97 parts by weight (pbw) | 3 pbw | 68.9 | 64.5 | 14.5 |
| Exp. 2 | sewage sludge | DL: A2 | Air-blow | 97 pbw | 3 pbw | 67.1 | 66.4 | 17.8 |
| Exp. 3 | sewage sludge | DL: B1 | Air-blow | 97 pbw | 3 pbw | 68.9 | 65.3 | 16.2 |
| Exp. 4 | sewage sludge | DL: B2 | Air-blow | 97 pbw | 3 pbw | 67.1 | 65.1 | 16.8 |
| Exp. 5 | sewage sludge | DL: C1 | Air-blow | 97 pbw | 3 pbw | 68.9 | 64.0 | 16.1 |
| Exp. 6 | sewage sludge | DL: C2 | Air-blow | 97 pbw | 3 pbw | 67.1 | 67.1 | 17.1 |
| Exp. 7 | sewage sludge | DL: D | Air-blow | 97 pbw | 3 pbw | 75.8 | 63.7 | 13.9 |
| Exp. 8 | sewage sludge | DL: E | Air-blow | 97 pbw | 3 pbw | 75.8 | 65.3 | 13.9 |
| Exp. 9 | sewage sludge | DL: F1 | Air-blow | 95 pbw | 5 pbw | 67.0 | 65.5 | 11.1 |
| Exp. 10 | sewage sludge | DL: H | Air-blow | 80 pbw | 20 pbw | 70.9 | 70.4 | 13.9 |

TABLE 2

| Dehydrating Liquid (DL) | Emulsion Part No. | Manufacturer | Synthetic Resin | Dilution Rate Emulsion | Dilution Rate Water |
|---|---|---|---|---|---|
| DL: A1 | Pegal 756 | Koatsu Gas Kogyo Co., Ltd. | Acrylic resin | 10 parts by weight (pbw) | 90 pbw |
| DL: A2 | Pegal 756 | Koatsu Gas Kogyo Co., Ltd. | Acrylic resin | 20 pbw | 80 pbw |
| DL: B1 | Pegal 848 | Koatsu Gas Kogyo Co., Ltd. | Acrylic styrene resin | 10 pbw | 90 pbw |
| DL: B2 | Pegal 848 | Koatsu Gas Kogyo Co., Ltd. | Acrylic styrene resin | 20 pbw | 80 pbw |
| DL: C1 | Pegal 852 | Koatsu Gas Kogyo Co., Ltd. | Acrylic styrene resin | 10 pbw | 90 pbw |
| DL: C2 | Pegal 852 | Koatsu Gas Kogyo Co., Ltd. | Acrylic styrene resin | 20 pbw | 80 pbw |
| DL: D | SC-F | Gen Gen Corp. | Acrylic resin | 100 pbw | Absent |
| DL: E | SC-E | Gen Gen Corp. | Polyvinyl acetate resin | 100 pbw | Absent |
| DL: F1 | XDA-G1A | Gen Gen Corp. | Acrylic resin | 100 pbw | Absent |
| DL: F2 | XDA-G1A | Gen Gen Corp. | Acrylic resin | 50 pbw | 50 pbw |
| DL: F3 | XDA-G1A | Gen Gen Corp. | Acrylic resin | 10 pbw | 90 pbw |
| DL: G1 | XDA-G1B | Gen Gen Corp. | Acrylic resin | 50 pbw | 50 pbw |
| DL: G2 | XDA-G1B | Gen Gen Corp. | Acrylic resin | 10 pbw | 90 pbw |
| DL: H | XDA/AHP-A001 | Atom Support Co., Ltd. | Acrylic resin | 100 pbw | Absent |

As is seen from Table 1, each of the experimental examples 1 to 10 had the moisture content percentage of 11.1 to 17.8 mass % after air-blow drying of 12 hours. In a case where an obtained dewatered cake 1 was subjected directly to air-blow drying without being subjected to the mixing step S1 and others, even though it is not shown in Table 1, the moisture content percentage measured after continuous drying for 10 days was about 30 mass %.

Operations and effects of the present example will be explained below. In this example, in the mixing step S1, the particles 10 are mixed with the dehydrating liquid 2 to produce the mixture 3 in which the surfaces of the particles 10 are made contact with, i.e., exposed to, the dehydrating liquid 2. Thus, the surfaces of the particles 10 can be uniformly coated with the dehydrating liquid 2 as shown in FIG. 3.

In the drying step S3, the mixture 3 is dried, thereby causing drying of the dehydrating liquid 2 and evaporation of the moisture contained in the particles 10. In the drying step S3, air is forcibly blown against the mixture 3. As a result, as shown in Table 1, the evaporation of moisture contained in the particles 10 is accelerated and hence the drying speed of the mixture 3 can be increased.

In the drying step S3, as mentioned above, the dehydrating liquid 2 and the particles 10 are dried simultaneously. This can reduce the moisture content percentage of the particles 10 and form the synthetic resin coating 21 at the same time. Thus, the process of manufacturing the dried combustible material 31 can be more simplified.

The dehydrating liquid 2 contains, as synthetic resin, acrylic resin or polyvinyl acetate resin. The dehydrating liquid 2 containing the resin acts to relatively greatly accelerate drying of the particles 10 and thus can be suitably used to dry the particles 10. The synthetic resin coating 21 made of the resin is water-repellent, thus enabling reducing moisture absorption of the dried combustible material 31 during storage and others and preventing the moisture content percentage from increasing or the dried combustible material 31 from becoming sticky. Accordingly, the dried combustible material 31 easy to handle can be obtained.

Furthermore, as shown in FIG. 1, the drying step S3 is performed on the mixture 3 formed into a plate-like shape having a thickness of 10 mm or less. Accordingly, the distance at which the moisture travels from the inside to the surface of the formed mixture 3 can be shortened. This enables further speeding up drying of the mixture 3.

As shown in FIG. 1, the cut surfaces 30 are formed to partition the mixture 3 into sections each having a desired size during forming or before start of the drying step S3 after forming, so that the mixture 3 is separated into a plurality of blocks. In the drying step S3, therefore, the surface area of the mixture 3 can be increased, resulting in a further increased drying speed of the mixture 3. As the mixture 3 contracts in association with drying, the mixture 3 is naturally divided along the cut surfaces 30 as shown in FIG. 1.

Thus, the size of the obtained dried combustible material 31 is easily made uniform and hence the dried combustible material 31 easy to handle can be obtained.

The method for manufacturing the dried combustible material can further increasing the drying speed of the combustible material by the simple process as mentioned above.

The dried combustible material 31 manufactured by the above manufacturing method has a moisture content percentage of 20 mass % or less and thus is small in volume and weight. This dried combustible material 31 can therefore be easily stored and transported. Further, the dried combustible material 31 having a low moisture content percentage can easily generate a relatively large amount of heat when it is used as fuel. In addition, the presence of the synthetic resin coatings 21 enables preventing the dried combustible material 31 from absorbing moisture during storage to avoid an increase in moisture content percentage or from becoming sticky. The thus produced dried combustible material 31 is very easy to handle.

Since the dewatered cake 1 made of sewage sludge is used as the combustible material, the dried combustible material 31 with a moisture content percentage reduced by the aforementioned manufacturing method can be prevented from decaying and thus be stored for a long period. Reducing the moisture content percentage can also reduce specific odor.

In a case of using the dried combustible material 31 as fuel, it is preferable as mentioned above that the dried combustible material 31 generates an amount of heat of 3700 to 5000 kcal/kg. On the other hand, in a measurement of the heat amount generated by burning the dried combustible material 31 obtained in experimental example 9 of the present example, a measured heat amount was 5130 kcal/kg. This value is slightly larger than the upper limit of the above specified range; however, it is possible to adjust the heat amount during burning into the specific range for example by appropriately adjusting conditions in the mixing step S1, the drying step S3, and others so as to increase the moisture content percentage of the dried combustible material 31.

Example 2

This example exemplifies manufacturing of dried combustible material by using sake lees as the combustible material in Example 1. Specifically, under the condition that sake lees having a moisture content percentage of 90.3 mass % is used, instead of sewage sludge, as the combustible material, the mixing step S1, the forming step S2, and the drying step S3 were performed as in Example 1. Accordingly, the dried combustible material 31 having a moisture content percentage of 12.8 mass % was obtained as shown in experimental example 11 in Table 3. Experimental example 12 in Table 3 exemplifies that drying was conducted in the same procedures as in experimental example 11 except that the dehydrating liquid was not added.

TABLE 3

| Experimental example No. | Combustible Material (CM) | Dehydrating Liquid 2 (DL) | Drying Method | Mixing Ratio CM | Mixing Ratio DL 2 | Moisture Content Percentage (mass %) Before mixing | At start of drying | At completion of drying |
|---|---|---|---|---|---|---|---|---|
| Exp. 11 | sake lees | DL: F1 | Air-blow | 95 pbw | 5 pbw | 90.3 | 90.3 | 12.8 |
| Exp. 12 | sake lees | Absent | Air-blow | 100 pbw | Absent | 90.3 | 90.3 | 32.3 |

Figure 5:
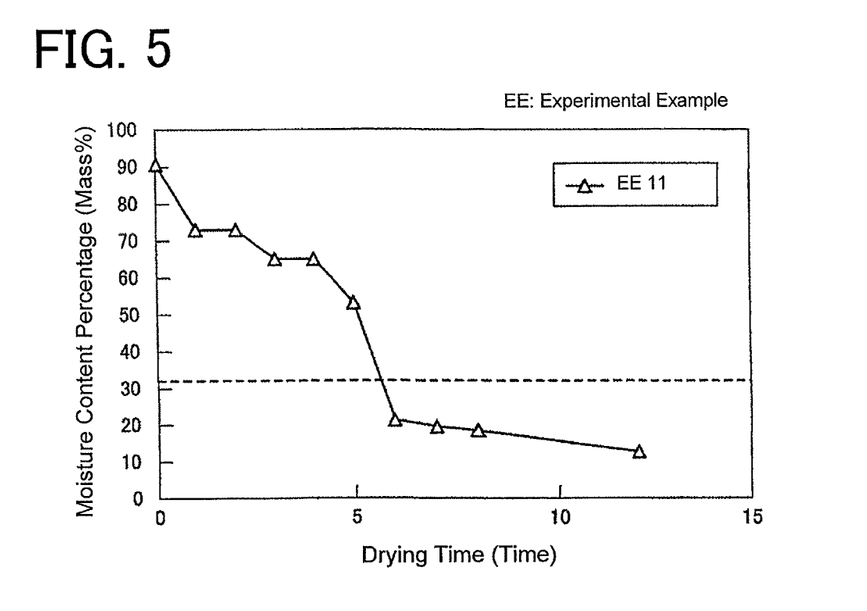
FIG. 5 is a graph showing changes in moisture content percentage during drying in a case of using sake lees as raw material in Example 2.

In the present embodiment, the moisture content percentage of the mixture 3 in experimental example 11 was measured during air-blow drying at intervals of 1 hour. This result is shown in FIG. 5. In FIG. 5, a lateral axis represents an elapsed time from the start of drying and a vertical axis represents measured values of the moisture content percentage. A broken line in FIG. 5 denotes a measured value of the moisture content percentage of the sake lees in experimental example 12 after 12 hours from the start of drying.

The sake lees used in this example is a solid matter discharged in the course of making Japanese sake (Japanese rice wine) and made of particles consisting of residues such as brewer's rice. As is found from Table 3 and FIG. 5, therefore, the use of the aforementioned manufacturing method can increase the drying speed. Other operations and effects obtained in this example are the same as those in Example 1.

Example 3

This example exemplifies the use of animal and/or plant waste as the combustible material in Example 1.

<Combustible Material>

In this example, as shown in Table 4, mascarene grass (*Zoysia matrella*) or jellyfish was used to manufacture the dried combustible material 31. Mascarene grass used herein was lawn grass cut by a mower or the like and had a moisture content percentage of 64.6 mass % before being mixed with the dehydrating liquid 2. Further, jellyfish used herein was cut in advance into 10-mm square pieces and had a moisture content percentage of 84.8 mass % before being mixed with the dehydrating liquid 2.

The aforementioned mascarene grass or jellyfish was subjected to the mixing step S1 as in Example 1 to produce the mixture 3 whose surface was coated with the dehydrating liquid 2. Successively, this mixture 3 was spread uniformly in an appropriate case or container and subjected to air-blow drying in a similar manner to that in Example 1. In this manner, as listed as experimental examples 21 and 23 in Table 4, the dried combustible material 31 made of mascarene grass and having a moisture content percentage of 11.4 mass % was produced and the dried combustible material 31 made of jellyfish and having a moisture content percentage of 9.6 mass % was produced. Experimental example 22 in Table 4 exemplifies that drying was conducted in the same procedures as in experimental example 21 except that the dehydrating liquid was not added. Experimental example 24 in Table 4 exemplifies that drying was conducted in the same procedures as in experimental example 23 except that the dehydrating liquid was not added.

Figure 6:
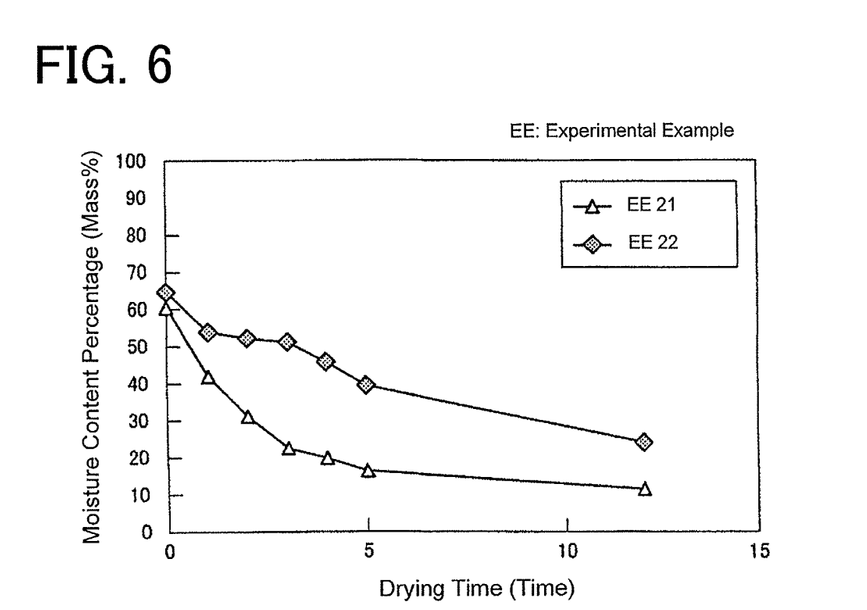
FIG. 6 is a graph showing changes in moisture content percentage during drying in a case of using mascarene grass as raw material in Example 3.

In the present example, in experimental examples 21 and 22 using mascarene grass, each moisture content percentage during air-blow drying was measured at intervals of 1 hour. Respective results are shown in FIG. 6. In FIG. 6, a lateral axis represents an elapsed time from start of drying and a vertical axis represents moisture content percentage values.

As is found from Table 4 and FIG. 6, the aforementioned manufacturing method is effective for not only sewage sludge and food waste but also animal and/or plant waste.

The aforementioned manufacturing method may use various combustible materials not limited to those shown in Examples 1 to 3. For instance, as the combustible material in Example 1, lignite may be used instead of sewage sludge. The following explanation is given to supplementary experimental examples performed using lignite.

In this example, before mixing with the dehydrating liquid 2, lignite was crushed or pulverized by a crusher to produce the lignite particles 10 each having a particle diameter of 1 mm or less. The lignite used in this example had a moisture content percentage of about 20 mass % before mixing with the dehydrating liquid 2, whereas just mined lignite generally has a moisture content percentage of about 50 to 60 mass %. Therefore, before mixing the particles 10 with dehydrating liquid 2, water was added to the particles 10 to adjust the moisture content percentage.

80 parts by weight of the particles 10 having a moisture content percentage adjusted as above was mixed with 20 parts by weight (pbw) of each dehydrating liquid listed in Table 5. The mixing step S1 was thus performed as in Example 1. Accordingly, the mixtures 3 of the particles 10 and the dehydrating liquids 2 were prepared. The moisture content percentage of each mixture 3 measured at the completion of the mixing step S1 is as shown in the column "At start of drying" in Table 5.

Subsequently, the mixture 31 was uniformly spread in an appropriate case or container and subjected to the drying step S3. The drying step S3 in the present example was conducted by two kinds of methods; air-blow drying as in Example 1 and natural drying, as shown in Table 5. The natural drying is a method for drying the mixture 3 under a room temperature environment without performing forcibly air-blowing or the like. In the present example, the room temperature varied in a range of 20 to 38° C.

As a result of subjecting the lignite particles 10 to the mixing step S1 and the drying step S3 as above, the dried combustible material 31 obtained by air-blow drying had a moisture content percentage of 13.6 to 17.3 mass % and the dried combustible material 31 obtained by natural drying had a moisture content percentage of 12.9 to 19.5 mass % as shown in experimental examples 31 to 39 in Table 5.

TABLE 4

| Experimental example No. | Combustible Material (CM) | Dehydrating Liquid 2 (DL) | Drying Method | Mixing Ratio CM | Mixing Ratio DL 2 | Moisture Content Percentage (mass %) Before mixing | At start of drying | At completion of drying |
|---|---|---|---|---|---|---|---|---|
| Exp. 21 | Mascarene grass | DL: F1 | Air-blow | 95 pbw | 5 pbw | 64.6 | 60.5 | 11.4 |
| Exp. 22 | Mascarene grass | Absent | Air-blow | 100 pbw | Absent | 64.6 | 64.6 | 24.1 |
| Exp. 23 | Jellyfish | DL: F1 | Air-blow | 90 pbw | 10 pbw | 84.8 | 72.7 | 9.6 |
| Exp. 24 | Jellyfish | Absent | Air-blow | 100 pbw | Absent | 84.8 | 72.9 | 43.9 |

TABLE 5

| Experimental example No. | Combustible Material (CM) | Dehydrating Liquid 2 (DL) | Drying Method | Mixing Ratio CM | Mixing Ratio DL 2 | Moisture Content Percentage (mass %) At start of drying | Moisture Content Percentage (mass %) At completion of drying |
|---|---|---|---|---|---|---|---|
| Exp. 31 | Lignite | DL: F1 | Air-blow | 80 pbw | 20 pbw | 46.1 | 14.0 |
| Exp. 32 | Lignite | DL: F2 | Air-blow | 80 pbw | 20 pbw | 51.6 | 13.6 |
| Exp. 33 | Lignite | DL: F3 | Air-blow | 80 pbw | 20 pbw | 63.5 | 17.3 |
| Exp. 34 | Lignite | DL: G1 | Air-blow | 80 pbw | 20 pbw | 43.2 | 13.9 |
| Exp. 35 | Lignite | DL: F1 | Natural drying | 80 pbw | 20 pbw | 46.1 | 15.8 |
| Exp. 36 | Lignite | DL: F2 | Natural drying | 80 pbw | 20 pbw | 51.6 | 14.5 |
| Exp. 37 | Lignite | DL: F3 | Natural drying | 80 pbw | 20 pbw | 63.5 | 19.5 |
| Exp. 38 | Lignite | DL: G1 | Natural drying | 80 pbw | 20 pbw | 43.2 | 12.9 |
| Exp. 39 | Lignite | DL: G2 | Natural drying | 80 pbw | 20 pbw | 56.6 | 18.1 |

The invention claimed is:

1. A method for manufacturing dried combustible material, the method including:
    a mixing step of mixing a number of particles made of combustible material containing moisture and a dehydrating liquid made of an emulsion containing synthetic resin to form a mixture in which surfaces of the particles are made to contact with the dehydrating liquid;
    a shaping step of forming the mixture into a shaped object, the shaping step comprising forming the mixture into a plate-like shape having a thickness of 10 mm or less and optionally separating the plate-like shape into a plurality of blocks, or forming the mixture into pellets having an average diameter of 10 mm or less with a granulator, the shaped object having a shape of one of the plate-like shape, the blocks formed from the plate-like shape or pellets, the shape of the shaped object permitting drying of the shaped object by blowing air toward the shaped object under a room-temperature environment through an air blower; and
    a drying step of drying the shaped object to form a dried object, wherein the drying step includes blowing air toward the shaped object under a room-temperature environment through an air blower, the drying step forming a synthetic resin coating made of the dehydrating liquid dried on the surfaces of the particles and evaporating the moisture of the particles, the dried shaped object comprising coated particles including particles having a reduced moisture content percentage and the synthetic resin coating that covers the surfaces of the particles, thereby producing the dried combustible material made up of the dried shaped object including the coated particles, wherein when the air is blown at a velocity of 1.9 to 5.2 m/s at a position 50-cm away from the air blower for 12 hours, the moisture content percentage of the dried combustible material is reduced to 20 mass % or less.

2. The method for manufacturing dried combustible material according to claim 1, wherein the drying step is performed until the moisture content percentage of the dried combustible material is reduced to from 10 mass % or more to 18 mass % or less.

3. The method for manufacturing dried combustible material according to claim 1, wherein the synthetic resin contained in the dehydrating liquid is acrylic resin, urethane resin, or polyvinyl acetate resin.

4. The method for manufacturing dried combustible material according to claim 1, wherein the shape object is the plate-like shape having a thickness of 10 mm or less.

5. The method for manufacturing dried combustible material according to claim 4, wherein the shaped object is the blocks separated from the plate-like shape.

6. The method for manufacturing dried combustible material according to claim 1, wherein the combustible material is sewage sludge.

7. The method for manufacturing dried combustible material according to claim 1, wherein the combustible material is food waste.

8. The method for manufacturing dried combustible material according to claim 1, wherein the combustible material is lignite.

9. The method for manufacturing dried combustible material according to claim 8, wherein the particles have a particle diameter of 5 mm or less.

10. The method for manufacturing dried combustible material according to claim 1, wherein the dried combustible material will generate an amount of heat of 3700 to 5000 kcal/kg when the dried combustible material is burned.

11. The method for manufacturing dried combustible material according to claim 2, wherein the synthetic resin contained in the dehydrating liquid is acrylic resin, urethane resin, or polyvinyl acetate resin.

12. The method for manufacturing dried combustible material according to claim 3, wherein the combustible material is sewage sludge.

13. The method for manufacturing dried combustible material according to claim 3, wherein the combustible material is food waste.

14. The method for manufacturing dried combustible material according to claim 3, wherein the combustible material is lignite.

15. The method for manufacturing dried combustible material according to claim 1, wherein
    the synthetic resin contained in the dehydrating liquid is acrylic resin, urethane resin, or polyvinyl acetate resin, and the synthetic resin coating is water-repellent, and
    a mixing ratio of the dehydrating liquid in the mixture is 20 pbw or less.

* * * * *